May 1, 1956   F. CHRISTENSEN ET AL   2,743,907
PULSE GENERATOR FOR ELECTRIC FENCES
Filed July 6, 1953
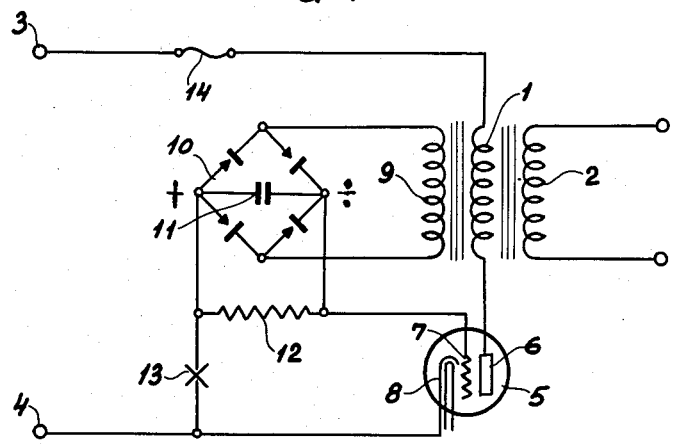
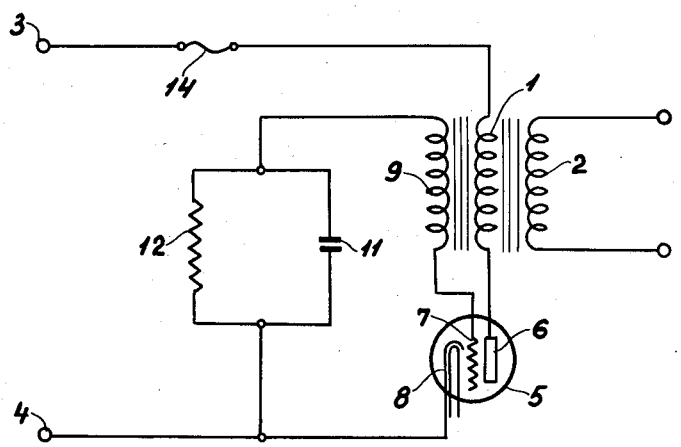
INVENTORS
Frantz Christensen
Adam J. L. Leopold
BY
Young, Emery, & Thompson
ATTORNEYS

United States Patent Office 2,743,907
Patented May 1, 1956

2,743,907

PULSE GENERATOR FOR ELECTRIC FENCES

Frantz Christensen, Gentofte, and Adam Johan Ludvig Leopold, Hellerup, Denmark

Application July 6, 1953, Serial No. 366,264

Claims priority, application Denmark July 31, 1952

9 Claims. (Cl. 256—10)

The present invention relates to a pulse generator for electric fences of the type adapted to be fed from a supply network, and more particularly an alternating current network or other alternating current source.

Most of the known pulse generators for such use fall within two principal groups, one comprising apparatus having a capacitor which is charged from the network and is thereafter discharged, as a rule across a transformer, to produce a pulse of short duration, the other group comprising apparatus in which the fence is coupled directly to the network for short periods with relatively long intervals therebetween by way of a transformer having suitable safety arrangement combined therewith.

Each of these two main types of apparatus has its advantages and its disadvantages. The first named type, the capacitor type apparatus, may be more advantageous from an ideal point of view, because they are as a rule capable, within the safety limits prescribed, to give a more powerful shock or stimulus, but on the other hand the large capacitor necessary in an apparatus of this type is a relatively delicate component. Consequently, there seems to be a trend towards the other main type, the transformer type apparatus, though the shock effect of these is somewhat less powerful.

It is the object of the present invention to devise an apparatus that so to speak combines the advantages of the two mentioned types. The invention takes its starting point in the transformer type apparatus and is based on the recognition that it is possible by suitable measures to make an impulse generator of this type supply a shock of approximately the same character as that supplied by the discharge of a condenser.

In a pulse generator of the transformer type, means are provided for causing the fence to be coupled or switched through to the supply source via the transformer for short periods of time with relatively long intervals therebetween. In the past, this has been accomplished by means of various types of switches, such as mercury switches of rotating, oscillating or thermal type. With all these switching methods, the duration of the switching through or "shock" period, and particularly the location thereof relative to the cyclic variations of the alternating current, will be rather subject to mere chance, and it is therefore usually necessary to have the switching through period extend through a few cycles in order to obtain a tolerably uniform shock each time. The electric shock will therefore have the character of an alternating current pulse of short duration, as against the more powerful discharge type pulse obtained by the capacitor type apparatus.

To eliminate this drawback, means are provided according to the invention for determining the time of commencement and the time of ending of said switching through periods depending on the instantaneous value of the alternating current feeding voltage.

Since the said means are controlled by the cyclic variations of the alternating current power supply, the switching through of the fence to the alternating current source will always be initiated in the same point of the cycle of the alternating current and it is therefore possible to obtain a very constant shock effect of shocks having a very limited duration, e. g. a duration corresponding to a single cycle or, according to a preferred embodiment of the invention, approximately one quarter of a cycle of the alternating current supply.

Preferably, according to the invention, the primary circuit of the transformer may include an ionizable discharge tube having a control grid coupled to a time constant circuit controlled by the transformer. In an apparatus of this type each pulse is initiated by ionization of the discharge tube near the peak of the alternating current supply voltage, whereafter the time constant circuit, under the influence of the voltage or current of the transformer during the pulse, changes the potential of the control grid to a value at which the discharge in the tube cannot be continued when the instantaneous value of the alternating current voltage falls below the ionization voltage, and cannot be initiated again until the control grid has again reached a value permitting renewed striking of the tube, which will occur at a delay determined by the time constant circuit.

According to a preferred embodiment of the invention, the time constant circuit is constituted by a capacitor with leak resistance connected between the grid and the cathode of said discharge tube, said capacitor being coupled through rectifying means to the primary circuit of said transformer in such a manner as to be charged during the periods of time when the primary winding of said transformer is connected to the alternating current source.

The said rectifying means may be formed by separate rectifiers such as dry cells, but in the preferred embodiment of the invention, the use of such separate rectifiers is avoided by employing the grid-cathode path of the discharge tube as rectifying means.

This results not only in a reduction of the necessary number of components of the pulse generator, and thereby a reduction of the production costs, but also the additional advantage that it will be much easier to obtain an accurate adjustment of the time constant circuit, since the leakage of the rectifying means, which is unavoidable when using dry cells, is completely eliminated. As the said leakage may have a considerable influence on the time constant of the time constant circuit, it will be understood that a much more regular operation of the apparatus can be achieved when the said leakage is eliminated.

The invention will now be described in further detail with reference to the accompanying drawing in which Figs. 1 and 2 show circuit diagrams of two different examples of a pulse generator according to the invention.

In Fig. 1, 1 is the primary winding of a transformer, the secondary winding 2 of which is connected between an electric fence and earth. The primary winding 1 is connected to an alternating current source, e. g. an alternating current power network at terminals 3 and 4 through the anode-cathode path of an ionizable discharge tube 5, e. g. of the so-called dynatron type, having an anode 6, a control grid 7 and a cathode 8. An auxiliary winding 9 of the transformer is connected to two opposite corners of a Graetz rectifying bridge 10 having its other pair of opposite corners connected to a capacitor 11 connected between the control grid 7 and the cathode 8 in parallel to a leakage resistance 12.

The operation is as follows:

When an alternating current voltage is supplied to the terminals 3 and 4, the tube 5, the grid 7 of which has the same potential as the cathode, will be non-conducting until the instantaneous value of the alternating current voltage reaches a certain value, and until this occurs, no current flows through the primary winding of the transformer.

When the said value is exceeded, the discharge tube is struck, and its gas filling is ionized, so that practically the full value of the supply voltage will now be present across the primary winding 1. Thereby a voltage is induced across the winding 9, which voltage, by way of the Graetz bridge, causes the capacitor 11 to be charged, so that the gird 7 assumes a negative potential. When the instantaneous value of the supply voltage falls below the ionization voltage (burning voltage), the tube is extinguished, and owing to the negative potential of the grid 7 it cannot be struck again. Now the capacitor 11 begins slowly to discharge across the resistance 12, and consequently the potential of the grid 7 will rise slowly. The more the grid potential approaches zero, the closer will the maximum voltage across the anode-cathode of the tube approach a value at which an ionization can be initiated. The maximum chance of ionization occurs once during each cycle of the alternating current supply, viz. when the latter has its maximum value of one polarity, and when the grid voltage 7 has reached a certain value, an ionization consequently occurs exactly in the mentioned point of the cycle of the alternating current supply. The primary winding 1, across which practically no voltage has been present in the meantime, now again receives practically the whole of the supply voltage, and the described operation is repeated so that the ionization ceases and the circuit of the primary winding 1 is thereby interrupted when the instantaneous value of the supply voltage falls below the ionization voltage of the tube.

It will be seen that in the manner described the primary winding 1 is connected shock-wise to the supply source, each individual shock or pulse being initiated approximately at the peak value of the supply voltage and extending through approximately one quarter of a cycle while the intervals between the pulses are determined by the time constant circuit 11, 12 and can therefore be selected as desired. Each time the primary winding is connected to the supply source as described, a high tension pulse of discharge character is produced in the secondary winding 2.

If the presence of a small positive voltage on the grid 7 is necessary to permit the discharge tube to strike at peak voltage between the cathode 8 and the anode 6, a small alternating current voltage may be introduced at the position indicated at 13, the said alternating current voltage having a phase relationship to the main supply source such as to displace the potential of the grid 7 in the positive direction in the same phase as that in which the anode is positive relative to the cathode.

For reasons of safety the primary circuit of the transformer should preferably include a fuse which interrupts the primary circuit if, owing to some defect of the apparatus, the current should be continued substantially beyond one half cycle.

The fuse may e. g. be so selected as to interrupt the primary circuit with certainty within two or three cycles. This interruption should occur even if the secondary circuit 2 is open, but on the other hand no interruption should take place during normal operation of the pulse generator even if the secondary winding 2 is short circuited.

Now, if the ratio of the short circuit and idling current of the transformer is of a value normal in such transformers, it may be difficult to have both these requirements fulfilled at a time, and to remedy this drawback so that the adjustment of the fuse will be less critical, it is proposed according to the invention to construct the transformer so as to have a relatively small difference between the idling and short circuit current thereof.

In Fig. 2, the use of the separate rectifiers 10 of Fig. 1 has been avoided by employing the ionizable electronic tube 5 itself as a rectifier. Apart from this, the circuit of Fig. 2 comprises the same components as those indicated in Fig. 1, and the same reference characters are used to denote similar components. To utilize the ionizable electronic tube as a rectifier, the time constant circuit constituted by the capacitor 11 and the leakage resistance 12 is connected in series with the transformer winding 9 between the control grid 7 and the cathode 8 of the tube 5. The control grid-cathode path will then be effective as a rectifier performing the same function as the Graetz bridge 10 of Fig. 1, and the function will therefore be in all substantials the same as described with reference to Fig. 1. It is to be understood, of course, that in Fig. 2 the function will be based on half wave rectification instead of full wave rectification, which however is of no avail. Moreover, in Fig. 2 the leakage of the Graetz bridge 10 of Fig. 1 is completely eliminated which is of importance because the said leakage is difficult to keep under control and may have a considerable influence on the frequency of the pulse generation.

The special arrangements described in connection with Fig. 1 for ensuring the striking of the tube under difficult circumstances, for obtaining safety against danger from touching the fence and for dimensioning the transformer for the particular purposes of the invention, may of course also be used in connection with the embodiment illustrated in Fig. 2.

We claim:

1. A pulse generator for electric fences comprising a transformer having a primary winding and a secondary winding and having a step up ratio from commercial supply voltage to powerful shock voltage between said two windings, said secondary winding being permanently connected between an electric fence and ground, said primary winding being included in a feeding circuit connected to an alternating current source, means being provided in said feeding circuit for recurrently rendering said feeding circuit conductive for short periods of time starting and ending at predetermined points of the cycle of the alternating current feeding voltage and for keeping said feeding circuit non-conductive for relatively long intervals therebetween, to thereby couple the fence directly to the alternating current source by way of the transformer during each of said short periods of time.

2. A pulse generator as in claim 1 in which the duration of each of said periods of time is approximately one quarter of a cycle of the alternating current feeding voltage.

3. A pulse generator as in claim 1 in which the feeding circuit of said transformer includes an ionizable discharge tube having an anode, a cathode and a control grid coupled to a time constant circuit controlled by said transformer.

4. A pulse generator as in claim 3 in which said time constant circuit is constituted by a condenser with leak resistance connected between the grid and the cathode of said discharge tube, said condenser being coupled through rectifying means to the primary circuit of said transformer in such a manner as to be charged during the periods of time when the primary winding of the said transformer is connected to the alternating current source.

5. A pulse generator as in claim 4 in which said rectifying means is constituted by the grid-cathode path of said discharge tube.

6. A pulse generator as in claim 5 in which a third winding of said transformer and a capacitor with leak resistance are connected in series between the grid and the cathode of said discharge tube.

7. A pulse generator as in claim 4 in which an auxiliary source of potential is connected in series with the voltage across said capacitor between the control grid and cathode of said discharge tube.

8. A pulse generator as in claim 1 in which the primary circuit of said transformer includes a fuse constructed to interrupt said primary circuit if the current therein is continued substantially beyond one half cycle of the alternating current feeding voltage.

9. A pulse generator as in claim 8 in which the transformer is constructed to have relatively little difference between the open circuit and short circuit current values thereof.

References Cited in the file of this patent

UNITED STATES PATENTS

| | | |
|---|---|---|
| 2,332,325 | Sevoy | Oct. 19, 1943 |
| 2,374,781 | Schade | May 1, 1945 |
| 2,526,551 | Gano | Oct. 17, 1950 |
| 2,567,667 | Hanchett | Sept. 11, 1951 |
| 2,586,310 | Dill | Feb. 19, 1952 |